(12) United States Patent
Sample

(10) Patent No.: US 7,352,507 B2
(45) Date of Patent: Apr. 1, 2008

(54) SCREEN ASSEMBLY

(75) Inventor: Greg Sample, Newberg, OR (US)

(73) Assignee: InFocus Corporation, Wilsonville, OR (US)

( * ) Notice: Subject to any disclaimer, the term of this patent is extended or adjusted under 35 U.S.C. 154(b) by 231 days.

(21) Appl. No.: 11/131,757

(22) Filed: May 17, 2005

(65) Prior Publication Data

US 2006/0262392 A1    Nov. 23, 2006

(51) Int. Cl.
| | |
|---|---|
| *G03B 21/56* | (2006.01) |
| *G03B 21/14* | (2006.01) |
| *G03B 21/22* | (2006.01) |
| *G02B 7/00* | (2006.01) |
| *H04N 5/64* | (2006.01) |

(52) U.S. Cl. .................. 359/450; 359/443; 359/896; 348/836; 353/119

(58) Field of Classification Search ............... 359/443, 359/450, 477, 896; 348/836, 839; 353/119
See application file for complete search history.

(56) References Cited

U.S. PATENT DOCUMENTS

| | | | |
|---|---|---|---|
| 6,252,637 B1 * | 6/2001 | Brock | 348/823 |
| 6,717,627 B2 * | 4/2004 | Senkler | 348/823 |
| 2003/0188500 A1 * | 10/2003 | Voegele | 52/466 |
| 2004/0094906 A1 * | 5/2004 | Gentemann et al. | 277/637 |
| 2004/0212881 A1 | 10/2004 | Peterson et al. | |

* cited by examiner

*Primary Examiner*—Diane I. Lee
*Assistant Examiner*—Magda Cruz
(74) *Attorney, Agent, or Firm*—Alleman Hall McCoy Russell & Tuttle LLP

(57) ABSTRACT

A screen assembly is disclosed, wherein the screen assembly includes a frame including a screen retention section configured to receive and retain the screen, wherein the screen retention section includes a channel configured to receive an edge of the screen, and a screen retaining member disposed at least partially within the channel between the screen and a first side of the channel, wherein the screen retaining member biases the screen against a second side of the channel to secure the screen in the screen retention section.

13 Claims, 3 Drawing Sheets

SCREEN ASSEMBLY

TECHNICAL FIELD

The present disclosure relates generally to a screen assembly, and more particularly to a screen assembly for displaying projected images.

SUMMARY

A screen assembly is disclosed, wherein the screen assembly includes a frame including a screen retention section configured to receive and retain the screen, wherein the screen retention section includes a channel configured to receive an edge of the screen, and a screen retaining member disposed at least partially within the channel between the screen and a first side of the channel, wherein the screen retaining member biases the screen against a second side of the channel to secure the screen in the screen retention section.

BRIEF DESCRIPTION OF THE DRAWINGS

The invention is illustrated by way of example and not by way of limitation in the figures of the accompanying drawings, in which the like references indicate similar elements and in which.

DETAILED DESCRIPTION

Figure 1:
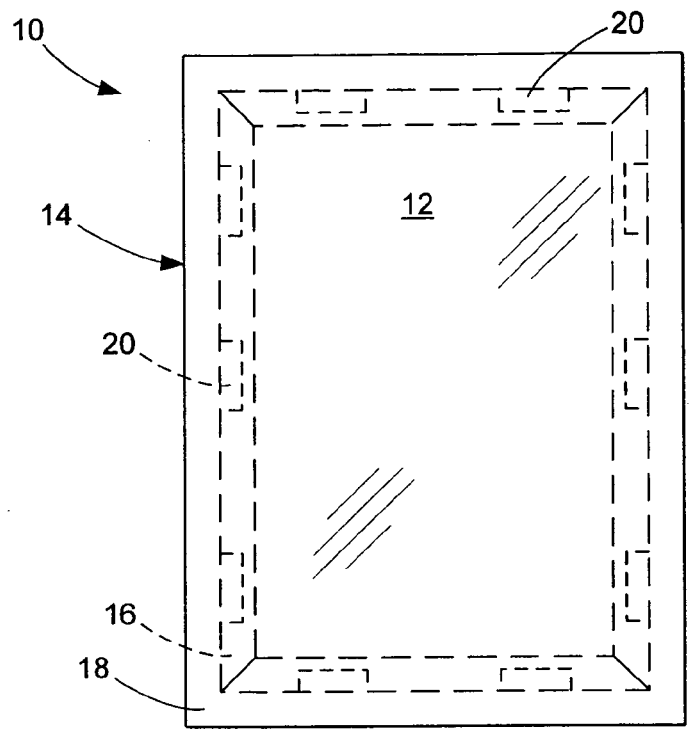
FIG. 1 is a schematic diagram of an embodiment of a screen assembly having an outer frame, an inner frame, and a plurality of screen retention sections disposed along each side of the inner frame.

FIG. 1 illustrates a screen assembly 10 including a screen 12 and a frame assembly 14 for supporting screen 12. Screen assembly 10 may be used in any suitable image display device, including but not limited to, rear projection display devices and front projection display devices.

Frame assembly 14 includes a screen retainer 16 configured to retain screen 12 in a desired position within frame assembly 14. Frame assembly 14 may further include a bezel 18 that supports screen retainer 16 and that provides an aesthetically pleasing appearance. Screen retainer 16 may be referred to herein as an inner frame 16, and bezel 18 may be referred to as an outer frame 18.

Outer frame 18 may support and retain inner frame 16 and, in some embodiments, also may be configured to be incorporated within a variety of enclosure-type structures, including but not limited to cabinet-type enclosures. Alternatively, outer frame 18 may be configured to be mounted on a variety of structures and/or surfaces including, but not limited to, other mounts, walls, etc. A variety of fastening mechanisms (not shown) may be used to facilitate incorporation and/or mounting.

Figure 2:
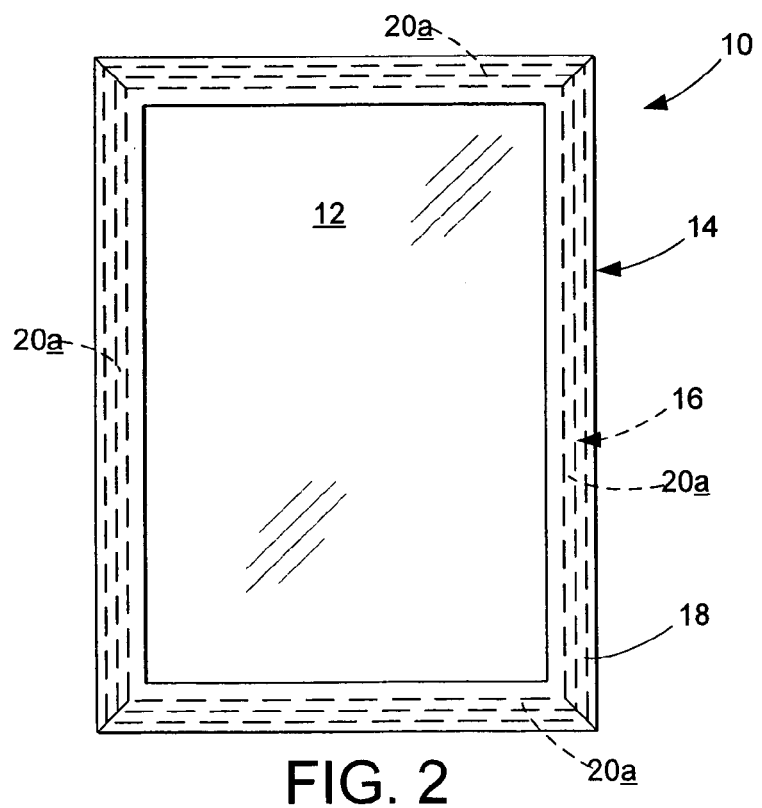
FIG. 2 is a plan view of an embodiment of a screen assembly including a screen and a frame assembly with an outer frame, an inner frame, and a continuous screen retention section disposed along each side of the inner frame.

As shown in FIGS. 1 and 2, inner frame 16 may include one or more screen retention sections 20 configured to engage screen 12 and to retain screen 12 in a desired position within frame assembly 14. In some embodiments, such as that shown in FIG. 1, screen retention sections 20 extend around at least a portion of the perimeter of screen 12 in spaced intervals. In these embodiments, screen retention sections 20 may be configured to join at the corners of screen 12 (not shown), or to be spaced from the corners of screen 12 (as shown in FIG. 1). In other embodiments, screen retention section may be a unitary piece that extends substantially the length of each side of screen 12, as shown at 20a in FIG. 2. In yet other embodiments, the screen retention section(s) may extend along only a portion of the perimeter of the screen, for example, along just a top edge of the screen.

Figure 3:
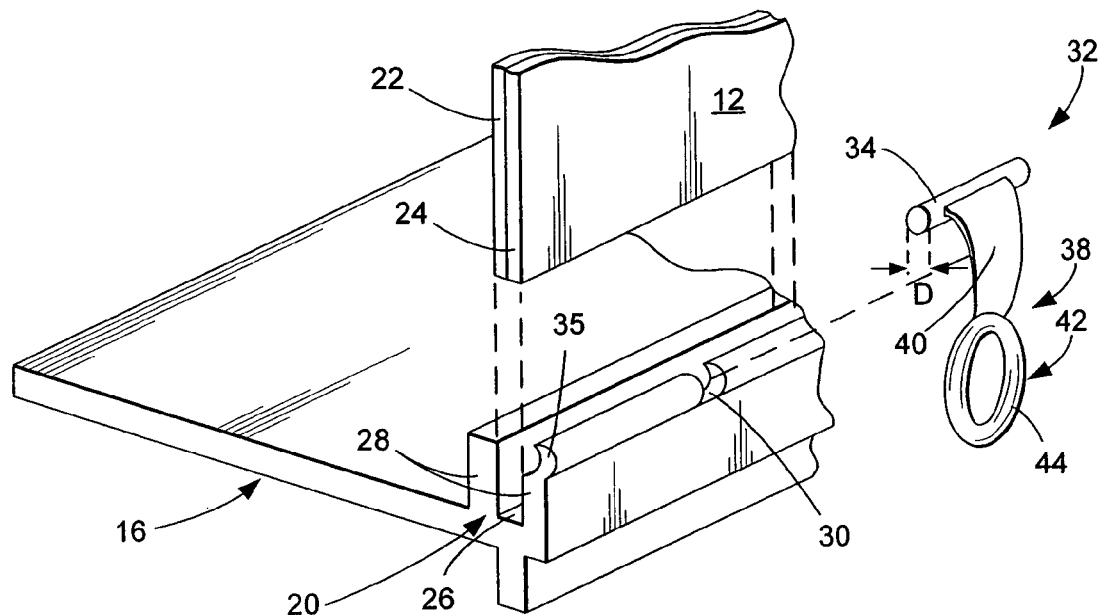
FIG. 3 is a partially-sectioned perspective view of the embodiment of FIG. 2.
Figure 4:
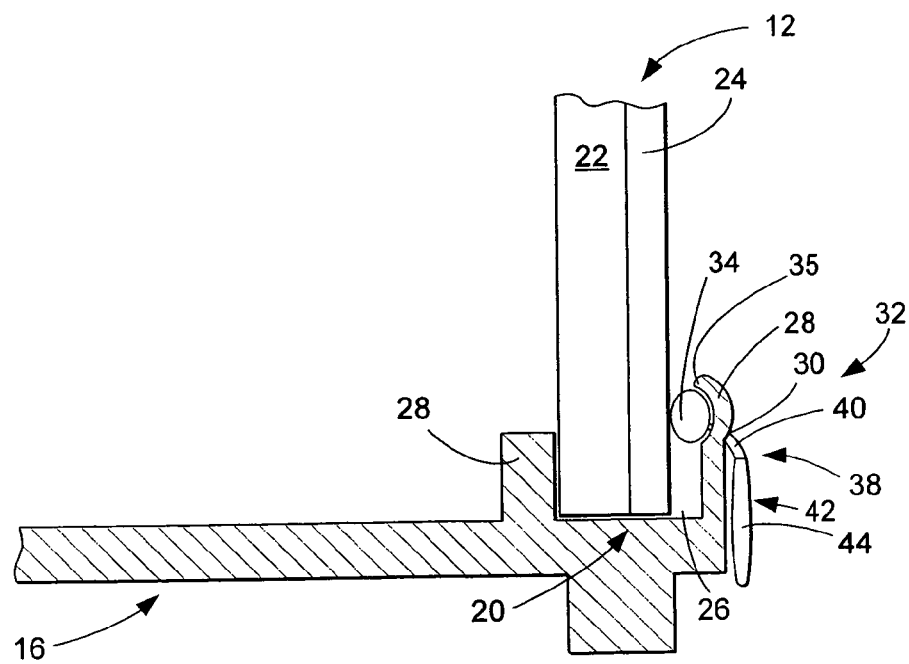
FIG. 4 is a partially-sectioned side view of the embodiment of FIG. 2, showing placement of a retaining member within a screen retention section.

Referring next to FIG. 3, screen 12 may include multiple sections or layers. For example, screen 12 may include a Fresnel lens-type screen ("Fresnel screen") 22, either alone or in combination with another screen 24, such as a diffuser screen and/or a touch-screen input device. It should be appreciated that screen 12 may be any suitable display screen.

Screen 12 may be made from any suitable material or materials. Examples of suitable materials for screen 12 include, but are not limited to, polycarbonate, polystyrene, acrylic polymers and combinations thereof. Screen retention sections 20 may be made from the same or substantially similar material or materials as screen 12, such that both screen 12 and screen retention sections 20 have substantially similar responses to environmental changes, including but not limited to changes in humidity and temperature. This may help to prevent flexing of screen 12 in response to environmental changes, and therefore may help to prevent image distortion caused by flexing of screen 12.

In other embodiments, screen retention sections 20 may be composed of a different material or materials than screen 12. However, the different material or materials may be selected to have similar physical properties as the screen material. For example, the screen retention sections 20 may be made of a material selected to have a similar coefficient of thermal expansion as screen 12. Likewise, the screen retention section material may be to have similar hygroscopic properties as screen 12. Suitable material for screen retention sections 20 include, but are not limited to, various polymers, such as polystyrene, nylons, acrylics, etc.

It should be appreciated that materials for the screen retention sections 20 may be based on other properties as well: For example, a material may be selected due to its frictional properties which may enhance the ability of the material to grip or retain the screen. Moreover, the chemical and/or structural stability of the material over time may make some materials more desirable than other materials.

Outer frame 18 likewise may be composed of any suitable material. Suitable materials include, but are not limited to, substantially rigid and stiff materials. As a non-limiting example, outer frame 18 may be aluminum, metal, reinforced plastics, glass-filled polymers, etc. The outer frame 18 may be mounted and secured to a variety of additional structures, such as a cabinet or other mount, of a projection and/or display device.

FIG. 3 also illustrates screen retention section 20 in more detail. As depicted, screen retention section 20 includes a groove or channel 26 configured to receive the screen 12, and a retaining member 32 to hold screen 12 within channel 26 and to limit relative motion between the screen 12 and the frame assembly 14.

Channel 26 may be formed by one or more ribs or extensions that extend from inner frame 16, or may be formed from a depression formed in inner frame 16. In the depicted embodiment, channel 26 is formed from a pair of opposing screen retainer ribs 28 configured to accept insertion of screen 12. Ribs 28 may also provide structural support to inner frame 16 such that inner frame 16 does not bend or collapse on itself.

Retaining member 32 is adapted to be at least partially inserted into screen retention section 20 to exert pressure on screen 12 and thereby secure screen 12 within channel 26. Retaining member 32 includes a screen-contacting portion 34 adapted to be inserted into channel 26 adjacent screen 12. At least one rib 28 may include a receptacle 35 configured to retain screen-contacting portion 34 when screen-contacting portion 34 is positioned within channel 26 between rib 28 and screen 12. In the depicted embodiment, receptacle 35 has a radius of curvature substantially similar to the radius of curvature of screen-contacting portion 34 to help prevent retaining member 32 from shifting in position. However, receptacle 35 may have any other suitable shape.

Screen-contacting portion 34 may be made at least partially of an elastomeric or deformable material that compresses as it is moved past the top of one of ribs 28 and subsequently expands into receptacle 35, thereby pressing screen 12 against the opposing rib 28. Careful selection of materials (and cross-sectional geometry or shape) for screen-contacting portion 34 and dimensions for the diameter D of screen-contacting portion 34 and ribs 28 may allow the pressure exerted on screen 12 by retaining member 32 to be tailored as desired. Furthermore, the use of an elastomeric or deformable material as screen-contacting portion 34 may help to provide shock and vibration resistance to screen assembly 10, thereby helping to prevent screen 12 from rattling in frame assembly 14. The elastomer will also allow the assembly to better accommodate thermal expansion & contraction.

Screen-contacting portion 34 may be made from any suitable material, and have any suitable hardness. Suitable hardnesses include, but are not limited to, hardnesses between approximately forty and seventy on the Shore-A hardness scale.

Likewise, screen-contacting portion 34 may have any suitable shape. The depicted screen-contacting portion has an elongate shape with a cylindrical cross-section. However, screen-contacting portion 34 may have any other suitable cross-section, including but not limited to, rectangular cross-sections, triangular cross-sections, other polygonal cross-sections, oval or other curvilinear cross-sections, tubular or hollow cross sections, etc. Furthermore, screen-contacting portion 34 also may have less of an elongate shape than that depicted. However, the use of a more elongate shape may help to distribute pressure more evenly along screen 12, and therefore may help to provide greater protection against screen flex. It will be appreciated that the depicted screen-contacting portion 34 may be manufactured by a simple extrusion or other molding process.

Retaining member 32 may include a gripping portion 38 that assists a user in moving screen-contacting portion 34 into screen retention section 20. In the depicted embodiment, gripping portion 38 includes an extension or tab 40 that passes through a notch 30 formed in rib 28 when screen-contacting portion 34 is positioned between screen 12 and rib 28. A user may move retaining member 32 into position between screen 12 and rib 28 by pulling gripping portion 38 downwardly to move tab 40 into notch 30 and retaining 32 into inner frame 16. Gripping portion 38 may be coupled to screen-contacting portion 34 in any suitable manner, or may be integrally formed with screen-contacting portion 34.

Gripping portion 38 may further include a handle 42 disposed at an end of tab 40. Handle 42 may have any suitable shape. For example, the depicted handle 42 has an aperture 44 formed therein. A user may insert a finger or other object through aperture 44 and pull up, down, etc. to engage or disengage screen-contacting portion 34 with screen retention section 20. This allows screen 12 to be installed in inner frame 16 without having to drill and/or tap holes, use clamps to push the sides o channel 26 together, and without the use of hand tools. Furthermore, notch 30 may be formed in rib 28 via a simple punching process, thereby simplifying the manufacturing process further. Other suitable shapes for handle 42 include, but are not limited to, "T"- and "J"-shaped grips.

Figure 5:
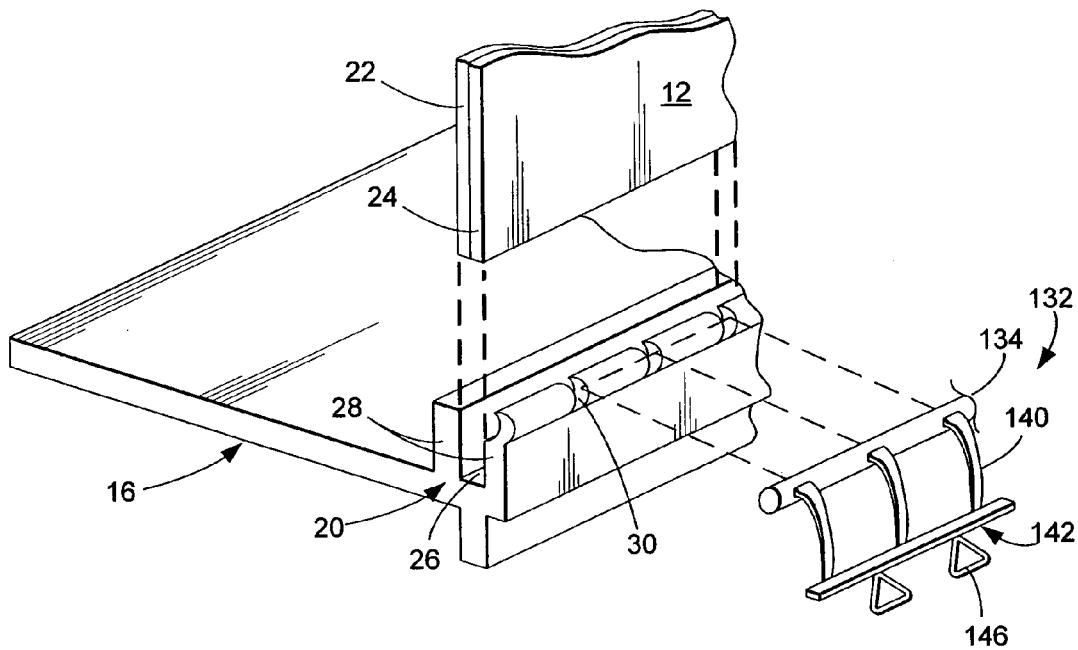
FIG. 5 is a partially-sectioned perspective view of the embodiment of FIG. 2.

FIG. 5 shows an alternate embodiment of a retaining member, generally at 132. Retaining member 132 takes the form of a continuous strip that engages substantially an entire side of inner frame 16. As shown, the retaining member may include several extensions 140 that pass through a series of notches 30 to engage the retaining member with the screen and frame assembly. Furthermore, retaining member 132 includes a handle 142 in the form of a continuous strip or bar.

Figure 6:
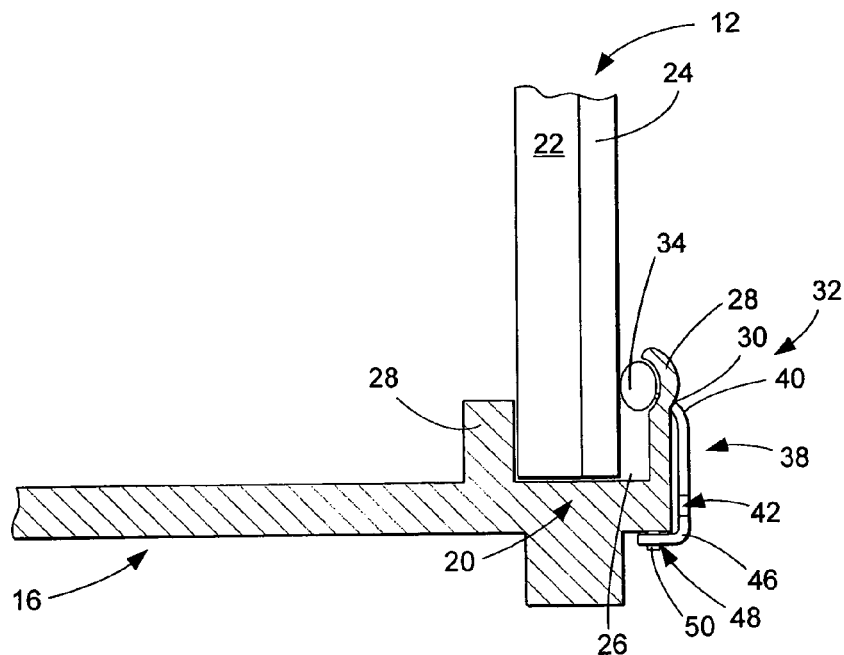
FIG. 6 is a partially-sectioned side view of the embodiment of FIG. 2, showing placement of a retaining member within a screen retention section.

As depicted in FIG. 6, retaining member 32 may include one or more securing portions 46 that secure retaining member 32 to inner frame 16. In the depicted example, securing portion 46 engages a latch member 48 on inner frame 12. The depicted latch member takes the form of a protrusion or post 50, which the securing portion extends over and encircles. However, securing portion 46 and latch member 48 may take any other suitable form. Furthermore, in some embodiments, handle 42 may double as the securing portion. In these embodiments, for example, aperture 44 may be configured to extend around latch member 48.

Although the present disclosure includes specific embodiments of screen assemblies and screen retention systems, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A screen assembly, comprising:
    a frame including a screen retention section including a channel, the channel having a first side and a second side configured to receive an edge of a screen therebetween, wherein the first side includes a notch and an indentation orientated substantially parallel to the edge of the screen; and a screen retaining member disposed at least partially within the channel between the screen and the indentation of the first side of the channel, wherein the screen retaining member biases the screen against the second side of the channel to secure the screen in the screen retention section, the screen retaining member having a gripping portion that extends through the notch and allows a user to pull the screen retaining member into position within the channel.

2. The screen assembly of claim 1, wherein the screen-retaining member includes a screen contacting portion having an elongate shape.

3. The screen assembly of claim 2, wherein the screen-contacting portion is at least partially formed from a material having a Shore-A hardness value approximately between forty and seventy.

4. The screen assembly of claim 2, wherein the screen-contacting portion has a radius of curvature substantially matching a radius of curvature of the indentation.

5. The screen assembly of claim 1, further comprising a securing portion adapted to secure the retaining member to the screen retention section.

6. The screen assembly of claim 5, wherein the securing portion includes an opening configured to receive a latch member that protrudes from a portion of the screen retention section.

7. A display screen system, comprising:
a screen;
a frame including a plurality of screen retention sections disposed at least partially around an interior perimeter of the frame, wherein each screen retention section includes a groove for receiving an edge of the screen, and where each groove includes a notch and an indentation orientated substantially parallel to the edge of the screen; and at least one retaining member disposed between the indentation and the screen, the retaining member having a gripping portion that extends through the notch and allows a user to pull the screen retaining member into position within the groove.

8. The display screen system of claim 7, wherein the frame includes a plurality of sides, and wherein at least one side of the frame includes a single screen retention section.

9. The display screen system of claim 8, wherein each side of the frame includes a single screen retention section that extends substantially completely along the side of the frame.

10. The screen retention system of claim 7, wherein the frame includes a plurality of sides, and wherein at least one side of the frame includes at least two screen retention sections.

11. The display screen system of claim 7, wherein the retaining member includes a deformable portion configured to fit in the groove between the indentation and the screen.

12. The display screen system of claim 11, wherein the deformable portion is made at least partially of an elastomeric material.

13. The display screen system of claim 7, wherein the retaining member has a radius of curvature substantially matching a radius of curvature of the indentation.

* * * * *